R. OKRASSA.
APPARATUS FOR WASHING COFFEE AND THE LIKE.
APPLICATION FILED SEPT. 30, 1911.

1,013,807.

Patented Jan. 2, 1912.

Witnesses:
C. J. Sweeney.
P. H. Clancy.

Inventor:
Roberto Okrassa,
by Baker & Baker,
Attorneys.

UNITED STATES PATENT OFFICE.

ROBERTO OKRASSA, OF ANTIGUA, GUATEMALA.

APPARATUS FOR WASHING COFFEE AND THE LIKE.

1,013,807.  Specification of Letters Patent.  Patented Jan. 2, 1912.

Application filed September 30, 1911. Serial No. 652,171.

*To all whom it may concern:*

Be it known that I, ROBERTO OKRASSA, a subject of the German Emperor and King of Prussia, and residing at Antigua, Gautemala, Central America, have invented a certain new and useful Improvement in Apparatus for Washing Coffee and the Like, of which the following is a specification.

This invention relates to an improved apparatus for washing coffee and the like of the kind comprising a drum or drums fitted or each fitted with beaters and revolving within a cylinder or cylinders through which the coffee is fed and wherein the coffee is brought into intimate contact with water and washed free of impurities. Apparatus comprising a pair of such cylinders each fitted with a drum is hereinafter particularly described with reference to the accompanying drawings in which—

Figure 1:
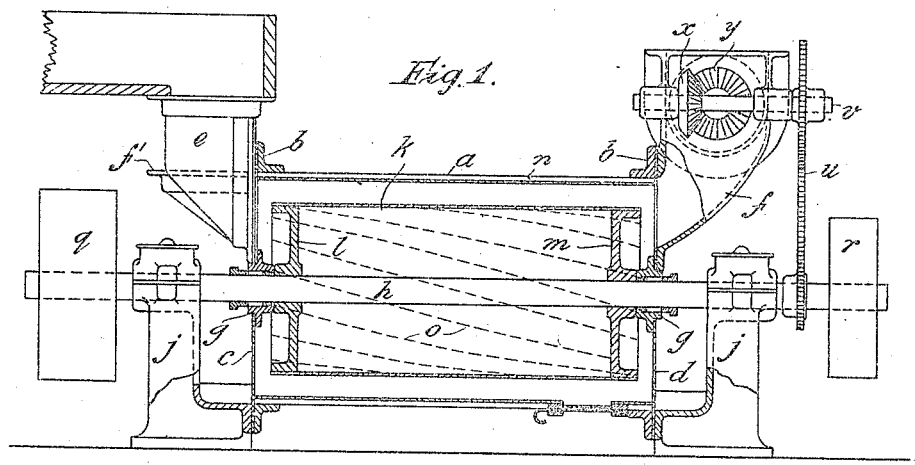
Figure 2:
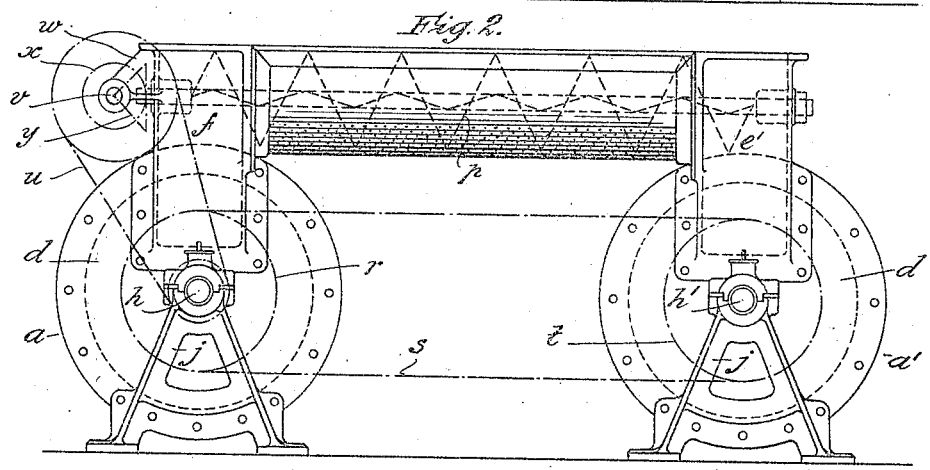

Figure 1 is a part longitudinal section and part side elevation; Fig. 2 is an end view; and Fig. 3 a cross section of the cylinder and drum.

I will proceed to describe in detail the construction of the front cylinder $a$ of a pair of similar cylinders $a$ and $a^1$, and of the parts coöperating therewith.

Figure 3:
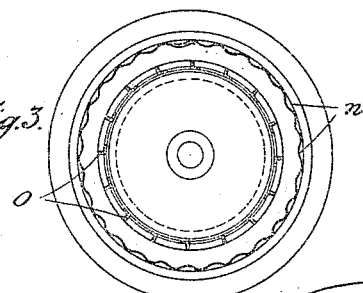

As best shown in Fig. 1, the cylinder or cylindrical casing $a$ is closed at both ends and provided with end flanges $b$ to which are fastened end plates $c$ and $d$ carrying inlet and discharge hoppers $e$ and $f$ respectively, and stuffing boxes $g$. Coaxially with the cylinder $a$ is disposed a shaft $h$ revolving in the stuffing boxes $g$ and supported by standards $j$ provided with suitable extensions for attachment to the cylinder ends. Fixed on the shaft $h$ is a drum $k$ spaced from the walls of the cylinder and secured to end castings $l$ and $m$. The cylinder $a$ is advantageously formed of steel plate bent so as to form rather flat longitudinally disposed corrugations $n$, as best shown in Fig. 3; and to the exterior of the drum are fitted a number of longitudinal radially projecting beaters $o$ of angle-iron or other suitable material disposed obliquely to the axis of the drum.

It will be understood that the coffee entering the inlet end of the cylinder $a$ from the hopper $e$ is caught by the beaters and passed along toward the opposite end of the cylinder and thence to the discharge hopper $f$; the coffee being thus brought into intimate contact with the water in the cylinder and washed free of impurities. For dealing with large quantities of coffee, in order to economize the washing water, two parallel cylinders or cylindrical casings $a$ and $a^1$ are placed side by side, as best shown in Fig. 2. A helical or other conveyer $p$ arranged in a perforated trough $p$, connecting the parallel cylindrical casings or cylinders $a$ and $a^1$, delivers the coffee from the discharge hopper $f$ of the first cylinder $a$ to the inlet hopper $e^1$ of the second cylinder $a^1$ in which the coffee is subjected to a final washing operation succeeding the preliminary washing operation effected in the cylinder $a$, the coffee being finally discharged at the hopper $f^1$.

As the coffee must pass through the cylinder $a^1$ in the direction opposite to that of its passage through the cylinder $a$, the beaters on the drum revolving within the second cylinder are inclined oppositely to those on the drum revolving within the first cylinder.

The underside of the conveyer trough is advantageously perforated for the purpose of drawing off dirty water from the coffee in its passage from one cylinder to another.

The shaft $h$ revolving within the first cylinder $a$ is driven by means of a pulley $q$; a pulley $r$ on the same shaft is connected by a belt $s$ to a similar pulley $t$ on the shaft $h^1$ of the second cylinder.

For driving the conveyer, motion is transmitted from the shaft $h$ by means of chain and sprocket gear $u$ to a shaft $v$ carried on an extension $w$ of the hopper $f$ and fitted with a bevel wheel $x$ meshing with a bevel wheel $y$ on the conveyer shaft.

It will be seen from the drawing that the cylinders are of considerable diameter and the inlet and discharge hoppers are advantageously located in relation to the cylinders.

As the bearings for the shafts are entirely outside the cylinders, there is no danger of the water washing the oil from the bearings. The grating for removing the dirty water is not liable to be choked and in fact practically constitutes a self-cleaning filter.

Having now described my invention what I claim and desire to secure by Letters Patent of the United States is:—

1. The improved coffee washing apparatus, comprising, in combination, a plurality of separated cylinders disposed parallel to each other, inlet and discharge hoppers fitted to the ends of each cylinder, a revoluble beater-drum fitted within each cylinder, a perforated conveyer trough disposed transversely of the axes of the cylinders and connecting the discharge hopper of one cylinder with the inlet hopper of an adjoining cylinder, and a rotary conveyer working in said trough.

2. The improved coffee washing apparatus, comprising in combination, a pair of corrugated cylinders disposed parallel to each other and each provided with inlet and discharge hoppers, standards located outside said cylinders, drums, one on each shaft, each drum fitted within a cylinder, said drums being provided with radially projecting beaters disposed obliquely to the axes of their respective shafts, a rotary conveyer disposed transversely of the axes of the cylinders, a perforated trough connecting the discharge hopper of one cylinder with the inlet hopper of the other cylinder and in which said conveyer works, means for driving the shafts, and means for driving the conveyer.

In testimony whereof I have signed my name to this specification in the presence of two subscribing witnesses.

ROBERTO OKRASSA.

Witnesses:
    AUGUSTO SCHAROCH,
    F. BOTTE.